(12) United States Patent
Tsaii et al.

(10) Patent No.: US 6,375,100 B1
(45) Date of Patent: Apr. 23, 2002

(54) ROBOT MOUNTED DOOR OPENER

(75) Inventors: Yu Chung Tsaii, Southfield; Jeffrey G. Gray, Madison Heights; Paul T. Prange, Royal Oak; Noel J. Gauci, Rochester Hills, all of MI (US)

(73) Assignee: ABB Automation Inc., New Berlin, WI (US)

( * ) Notice: Subject to any disclaimer, the term of this patent is extended or adjusted under 35 U.S.C. 154(b) by 0 days.

(21) Appl. No.: 09/644,326

(22) Filed: Aug. 23, 2000

(51) Int. Cl.[7] .............................................. B05B 15/00
(52) U.S. Cl. ...................... 239/587.1; 901/43
(58) Field of Search ..................... 239/587.1; 901/30, 901/43

(56) References Cited

U.S. PATENT DOCUMENTS

| | | | |
|---|---|---|---|
| 4,342,535 A | * 8/1982 | Bartlett et al. | 414/744.4 |
| 4,342,536 A | * 8/1982 | Akeel et al. | 414/744.4 |
| 4,498,414 A | * 2/1985 | Kiba et al. | 118/323 |
| 4,702,666 A | * 10/1987 | Iwao et al. | 118/326 |
| 4,988,260 A | * 1/1991 | Kiba et al. | 118/326 |
| 5,192,593 A | * 3/1993 | Matsuo et al. | 118/500 |
| 5,514,420 A | * 5/1996 | Tsuzuki et al. | 118/313 |

* cited by examiner

Primary Examiner—Lesley D. Morris
(74) Attorney, Agent, or Firm—Harness, Dickey & Pierce, P.L.C.

(57) ABSTRACT

A positioning device for positioning a movably mounted portion of a workpiece. The positioning device includes an attachment structure, a rod, a flange assembly and an engagement mechanism. The attachment structure includes a rod aperture and is coupled to a robotic apparatus. The rod is disposed within the rod aperture and is slidably positionable therein. The flange assembly is coupled to a distal end of the rod and includes a flange structure. The flange structure is rotatable relative to the rod and engages the movably mounted portion of the workpiece. The engagement mechanism is coupled to the attachment structure and is operable for moving the rod in an axial direction within the rod aperture. The engagement mechanism applies an axially directed force to the flange assembly to maintain the flange structure in a stationary position relative to the movably mounted portion of the workpiece when the movably mounted portion of the workpiece is moved relative to a remaining portion of the workpiece.

20 Claims, 4 Drawing Sheets

ROBOT MOUNTED DOOR OPENER

TECHNICAL FIELD

The present invention relates generally to end effectors and attachments for robotic apparatuses. More particularly, the present invention relates to an attachment for a robotic apparatus which is operable for repositioning a closure member which has been movably mounted to a workpiece.

BACKGROUND OF THE INVENTION

Backround Art

Robotic apparatuses are commonly employed in modern high-volume fabrication operations to perform repetitive tasks which would otherwise be tedious, fatiguing and/or difficult to perform manually in a cycle time of relatively short duration. One such task concerns the painting of a workpiece, such as an automotive vehicle, where high volume airless sprayers are frequently employed to coat the vehicle body with a film of liquid paint. The robust nature of a robotic apparatus permits the paint to be applied at volumes and pressures which are relatively high; these relatively high volumes and pressures typically cannot be employed when manually applying paint as the reaction force exerted onto the paint technician would render the spraying equipment difficult to control and fatiguing to operate.

Despite the advantages of robotic apparatuses, several drawbacks have been noted, particularly where a robotic apparatus is employed to perform a rather delicate operation wherein the workpiece is easily scratched or damaged if a portion of the robotic apparatus is slid along the workpiece. One common example concerns pivoting a hinged member of a workpiece. This situation is frequently encountered when repositioning the vehicle doors of an automotive vehicle as a vehicle is processed in a fabrication plant to permit the doorjamb of the vehicle body to be painted or to permit components such as seats to be installed to the vehicle.

The known attachment devices, including end effectors, typically lack the degree of freedom that is necessary to prevent the robotic apparatus from sliding relative to the hinged member of the workpiece, causing the attachment device or end effector to scratch and/or mar the finish of the workpiece. Accordingly, there remains a need in the art for an attachment device for a robotic apparatus which permits the arm assembly of a robotic apparatus to be employed to reposition the hinged member of a workpiece without scratching, marring or otherwise degrading the finish of the workpiece.

SUMMARY OF THE INVENTION

It is a general object of the present invention to provide a positioning device for a robotic apparatus which permits an arm assembly of the robotic apparatus to reposition a closure member which is movably mounted to a workpiece.

It is another object of the present invention to provide a positioning device which employs a flange assembly having a rotatable flange structure which permits a closure member of a workpiece to be movably repositioned without sliding the flange assembly along the closure member.

In one preferred form, the present invention provides a positioning device for positioning a movably mounted portion of a workpiece. The positioning device includes an attachment structure, a rod, a flange assembly and an engagement mechanism. The attachment structure includes a rod aperture and is coupled to a robotic apparatus. The rod is disposed within the rod aperture and is slidably positionable therein. The flange assembly is coupled to a distal end of the rod and includes a flange structure. The flange structure is rotatable relative to the rod and engages the movably mounted portion of the workpiece. The engagement mechanism is coupled to the attachment structure and is operable for moving the rod in an axial direction within the rod aperture. The engagement mechanism applies an axially directed force to the flange assembly to maintain the flange structure in a stationary position relative to the pivotably mounted portion of the workpiece when the movably mounted portion of the workpiece is moved relative to a remaining portion of the workpiece.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENT

Figure 1:
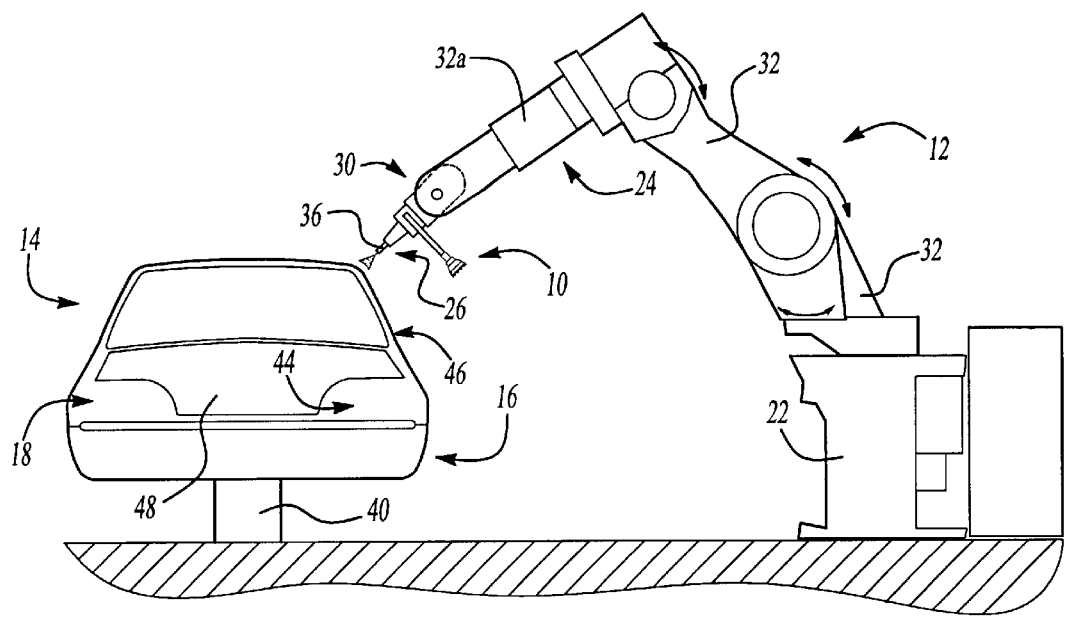
FIG. 1 is a side elevational view of a positioning device constructed according to the teachings of a preferred embodiment of the present invention illustrated in operative association with a robotic apparatus and an automated fabrication system.

With reference to FIG. 1 of the drawings, a positioning device constructed in accordance with the teachings of a preferred embodiment of the present is generally indicated by reference numeral 10. Positioning device 10 is illustrated to be in operative association with a robotic apparatus 12, an automated fabrication system 14 and a workpiece 16, such as automotive vehicle 18. In the particular embodiment illustrated, robotic apparatus 12 is shown to be a Model IRB 5400-03 multi-axis paint robot available from ABB Flexible Automation Inc. of Auburn Hills, Mich. As will be appreciated, this robot is merely illustrative and it is contemplated that any robotic device having an arm assembly that is movable in at least two orthogonal directions may be used with positioning device 10.

Robotic apparatus 12 is illustrated to include a base structure 22, an arm assembly 24 and an end effector 26. Base structure 22 is selectively pivotable about a generally vertical axis. Arm assembly 24 is coupled to base structure 22 and in the particular example provided, includes a wrist assembly 30 and a plurality of arm members 32 which pivotably couple wrist assembly 30 to base structure 22. Wrist assembly 30 is coupled to the distal end of arm member 32a and permits end effector 26 to be selectively rotated about the longitudinal axis of arm member 32a. End effector 26 is illustrated to include a pair of spray nozzles 36 for applying a liquid material, such as an acrylic epoxy paint, to workpiece 16.

Automated fabrication system 14 includes a transfer line 40 which is operable for conveying automotive vehicle 18 through a plurality of work stations to facilitate its finishing. With brief additional reference to FIG. 4, vehicle 18 includes a vehicle body 44 having a closure member 46, a hinge (not specifically shown) and a body structure 48 that defines a door aperture 50. The hinge movably couples closure member 46 to vehicle body structure 48, permitting closure member 46 to be moved between a first position wherein closure member 46 substantially closes door aperture 50 and a second position wherein closure member 46 substantially clears door aperture 50. Although closure member 46 is illustrated as being pivotably coupled to vehicle body structure 48, it will be understood that the teachings of the present invention have applicability to closure members which are coupled to vehicle body structures through means other than hinges. Accordingly, those skilled in the art will understand that closure member 46 may alternatively or additionally slide relative to vehicle body structure 48. Closure member 46 includes a frame 52 that defines a window aperture 54 having a windowsill 56.

Figure 2:
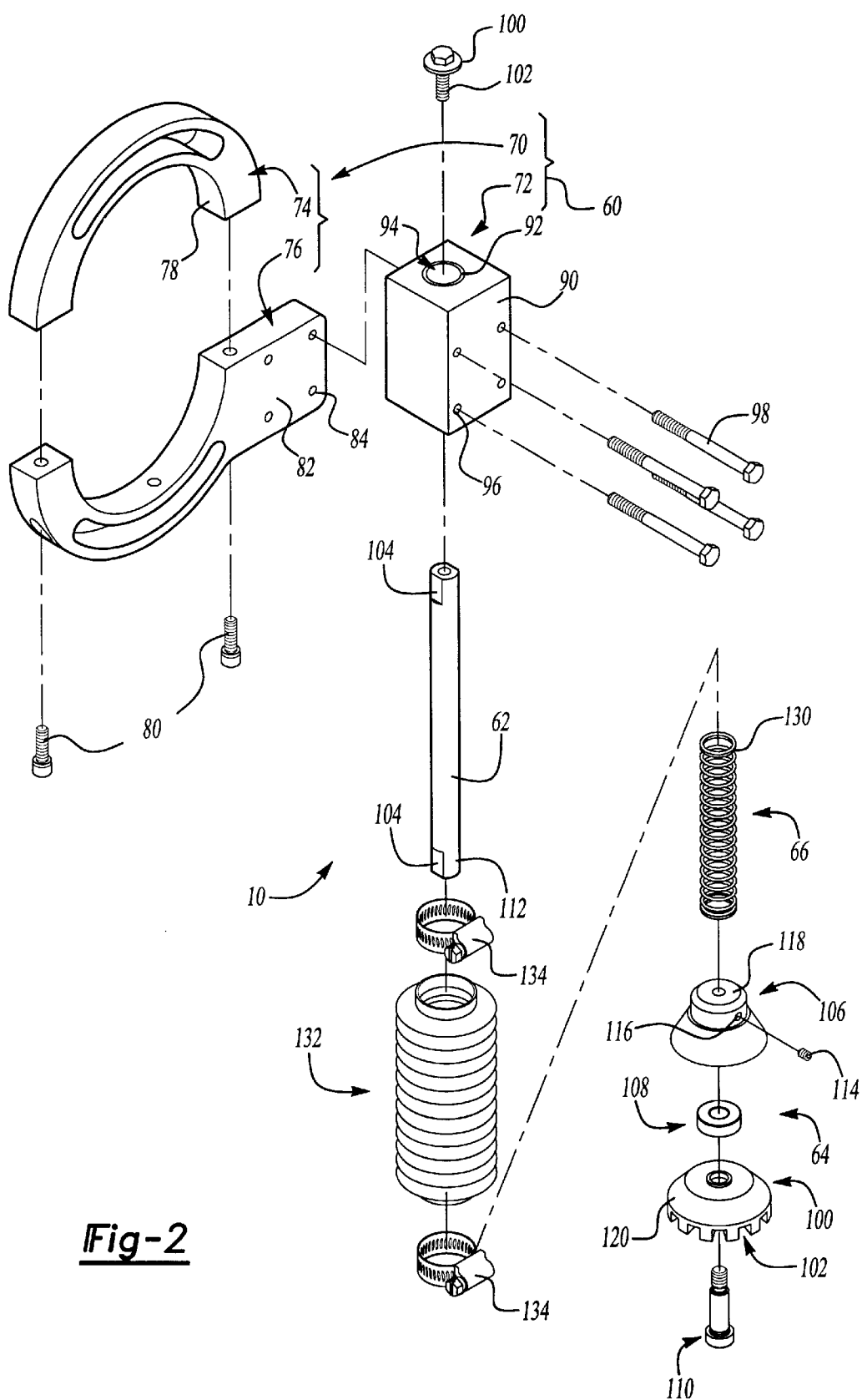
FIG. 2 is an exploded perspective view of the positioning device of FIG. 1.

In FIG. 2, positioning device 10 is shown to include an attachment structure 60, a rod 62, a flange assembly 64 and an engagement mechanism 66. Attachment structure 60 is operable for coupling positioning device 10 to a portion of arm assembly 24, such as wrist assembly 30. In the particular embodiment illustrated, attachment structure 60 is shown to include a bracket assembly 70 and a mounting assembly 72. Bracket assembly 70 includes first and second clamp structures 74 and 76, respectively. First clamp structure 74 is arcuate in shape, defining an inner surface 78 which is configured to mate to a portion of arm assembly 24 (e.g., wrist assembly 30). Second clamp structure 76 is configured to mate with a corresponding portion of arm assembly 24 as well as with first clamp structure 74. Threaded fasteners 80 are employed to fixedly but releasably couple first and second clamp structures 74 and 76 to one another as well as to develop a clamping force which is transmitted to arm assembly 24 to couple bracket assembly 70 thereto. Second clamp structure 76 also includes a mounting flange 82 having a plurality of threaded mounting holes 84.

Mounting assembly 72 includes a mounting structure 90 and a bushing 92 which cooperate to define a rod aperture 94 that extends along the longitudinal axis of mounting structure 90. A plurality of fastening apertures 96 extend through mounting structure 90 in a direction which is generally perpendicular to rod aperture 94. Fasteners 98 extend through fastening apertures 96 and threadably engage threaded mounting holes 84 to fixedly but releasably couple mounting structure 90 to the mounting flange 82 of second clamp structure 76.

First and second clamp structures 74 and 76 and mounting structure 90 are preferably formed from a plastic material, such as nylon, DELRIN®, UHMW and/or ERTALYTE®, which provides a structural foundation of sufficient strength for positioning device 10 while having characteristics (e.g., lubricity, relatively low shear strength) which provide protection against scratching or marring of the finish of vehicle body 44 in the event that one or more of these components inadvertently contacts vehicle body 44. Fasteners 98 are preferably formed from a plastic material such as nylon to guard against inadvertent marring and scratching of vehicle body 44, as well as to ensure that fasteners 98 will fracture so as to prevent the robotic apparatus 12 from being damaged in the event that positioning apparatus becomes entangled or otherwise caught in transfer line 40 or vehicle body 44.

Rod 62 is generally cylindrically shaped and is disposed through rod aperture 94, being slidably positionable therein. A washer 100 which is larger in diameter than rod aperture 94 is secured to the proximal end of rod 62 via threaded fastener 102 to inhibit the rod 62 from sliding completely through rod aperture 94. A pair of wrench flats 104 are formed in the opposite ends of rod 62 to permit a service technician to hold rod 62 in a stationary position to permit fastener 102 to be tightened.

Figure 3:
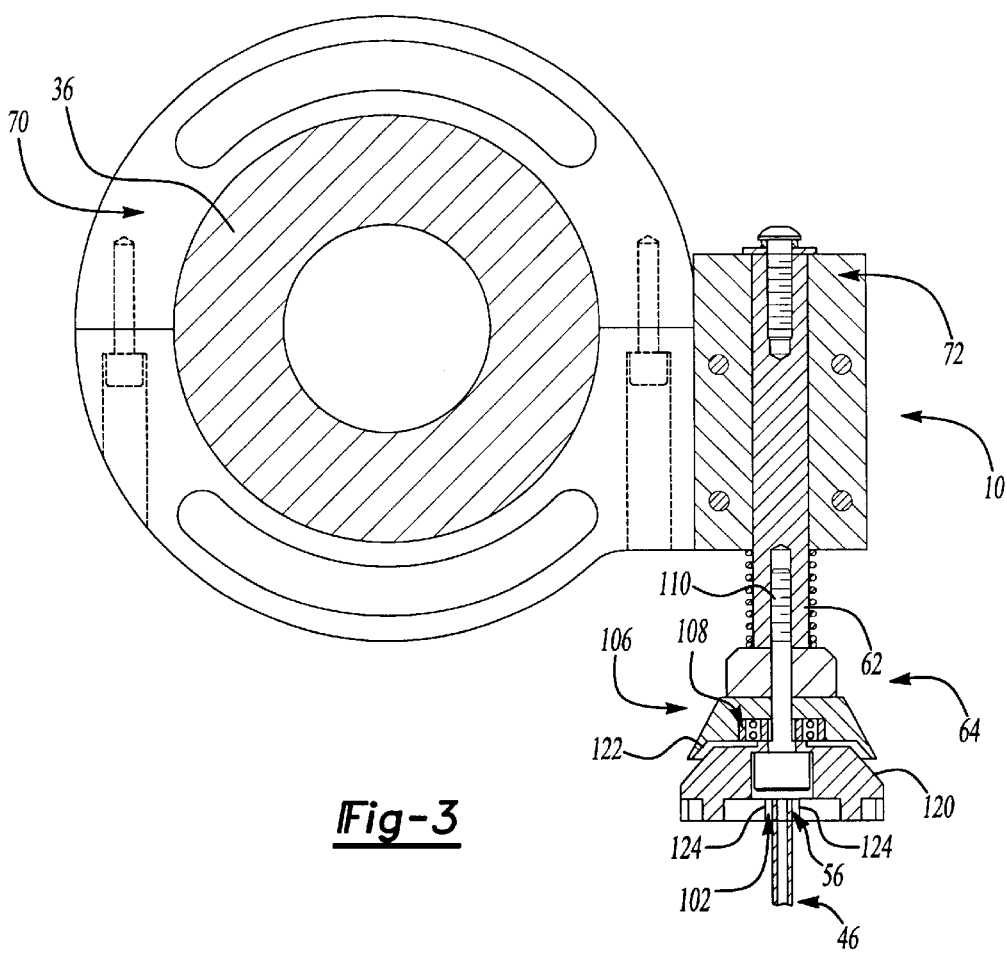
FIG. 3 is a longitudinal cross-sectional view the positioning device of FIG. 1 as engaged to a pivotably mounted portion of a workpiece.

With additional reference to FIG. 3, flange assembly 64 is coupled to the distal end of rod 62 and includes a first flange structure 100 which is rotatable relative to rod 62 and fabricated from stainless steel. The distal end of first flange structure 100 preferably includes a plurality of grooves 102 or is otherwise textured so as to improve the capability of first flange structure 100 to engage closure member 46. In the particular embodiment illustrated, each of the plurality of grooves 102 lies along a line that intersects an axis about which first flange structure 100 rotates, with each of the plurality of grooves 102 being defined by a pair of wall members 124 which are spaced apart a predetermined distance and skewed toward one another to receive a portion of the movably mounted closure member 46.

In the example provided, flange assembly 64 also includes a second flange structure 106 and a conventional bearing 108 which is disposed between first and second flange structures 100 and 106. A shoulder screw 110 extends through first and second flange structures 100 and 106 and bearing 108 and threadably engages a set of threads formed into the distal end 112 of rod 62, creating a clamping force which fixedly but removably couples second flange structure 106 to rod 62. A set screw 114 threadably engages a set screw aperture 116 formed in a collar portion 118 of second flange structure 106, creating a clamping force which prevents relative rotation therebetween.

First and second flange structures 100 and 106 are shown to be generally frusto-conical in shape, with first flange structure 100 including a hub portion 120 that is at least partially disposed within a recess portion 122 formed in second flange structure 106. Configuration in this manner permits first and second flange structures 100 and 106 to conceal bearing 108 as well as to avoid the formation of a pinch point between the stationary and rotating components.

Engagement mechanism 66 is coupled to attachment structure 60 and is operable for moving rod 62 in an axial direction within rod aperture 94 and applying an axially directed force to flange assembly 64. In the particular embodiment illustrated, engagement mechanism 66 includes a compression spring 130 that is disposed between attachment structure 60 and flange assembly 64, permitting rod 62 to travel between an extended position as illustrated in FIG. 4 and a retracted position as illustrated in FIG. 5.

Returning to FIG. 2, engagement mechanism 66 is also shown to include a flexible boot 132 which is secured to mounting structure 90 and flange structure 106 via a pair of worm clamps 134. Flexible boot 132 is formed from a resilient elastomeric material or plastic and shrouds compression spring 130 to prevent compression spring 130 from scratching or marring the finish of vehicle body 44 in the event that compression spring 130 inadvertently contacts vehicle body 44.

Figure 4:
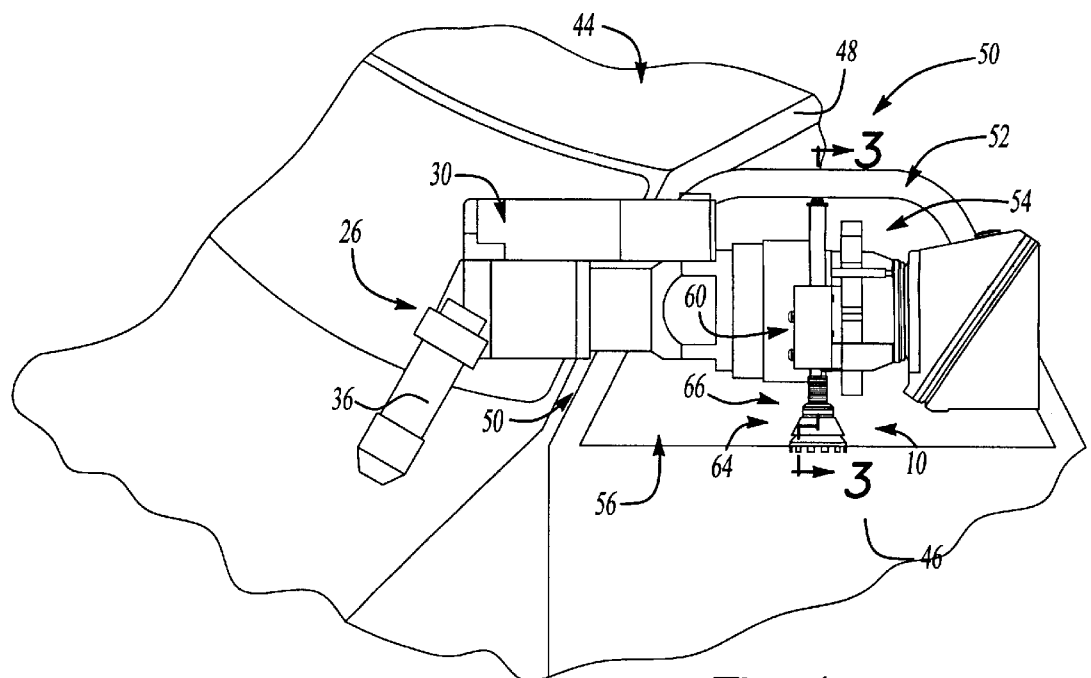
FIG. 4 is a front elevational view of a portion of the positioning device of FIG. 1 illustrating the flange assembly in an extended position.
Figure 5:
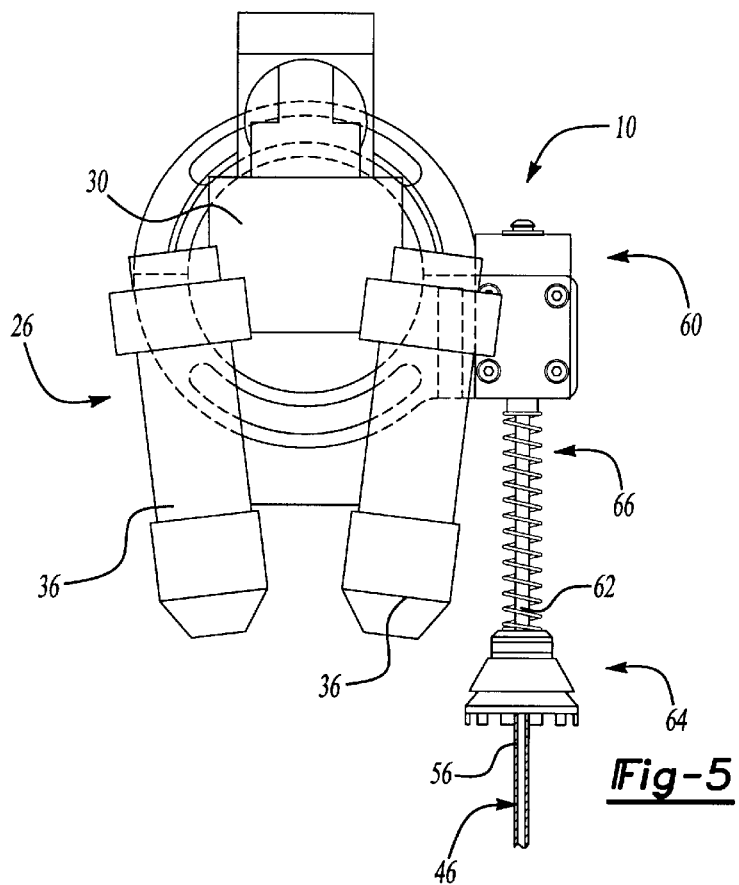
FIG. 5 is an enlarged view of a portion of the positioning device of FIG. 1 illustrating the flange assembly in a retracted position.

In operation, robotic apparatus 12 is operable for positioning arm assembly 24 relative to closure member 46 such that flange assembly 64 is positioned vertically over windowsill 56 as illustrated in FIG. 4. Arm assembly 24 is then lowered to permit first flange assembly 64 to contact closure member 46 such that window sill 56 is disposed within one of the plurality of grooves 102 as illustrated in FIG. 5. The radius of first flange structure 100 is sized to accommodate variation in the cross-car positioning of windowsill 56, whether the variation be related to the fabrication of body structure 48 or to the positioning of vehicle body 44 on transfer line 40.

In the lowered position, compression spring 130 is compressed and exerts an axially directed force along the axis of rod 62 which causes first flange structure 100 to remain in a stationary position relative to closure member 46 while arm assembly 24 is manipulated to cause closure member 46 to pivot to its open position. That first flange structure 100 is rotatable about the longitudinal axis of rod 62 is critical to the invention as without the capacity to rotate, first flange structure 100 would move as closure member 46 was pivoted, causing first flange structure 100 to slide along and/or turn on window sill 56 and thereby scratch or otherwise mar the finish of vehicle body 44.

Once closure member 46 has been positioned in a desired manner, arm assembly 24 is moved to a raised position wherein first flange structure 100 is disengaged from windowsill 56. Robotic apparatus 12 is then operated to perform a desired task with end effector 26, such as the painting of the portion of body structure 48 adjacent to door aperture 50 (i.e., the doorjamb). Closure member 46 may thereafter be closed by lowering arm assembly 24 such that first flange structure 100 engages window sill 56, manipulating arm assembly to position closure member 46 in the closed position and raising arm assembly 24 to disengage first flange structure 100 from window sill 56.

Figure 6:
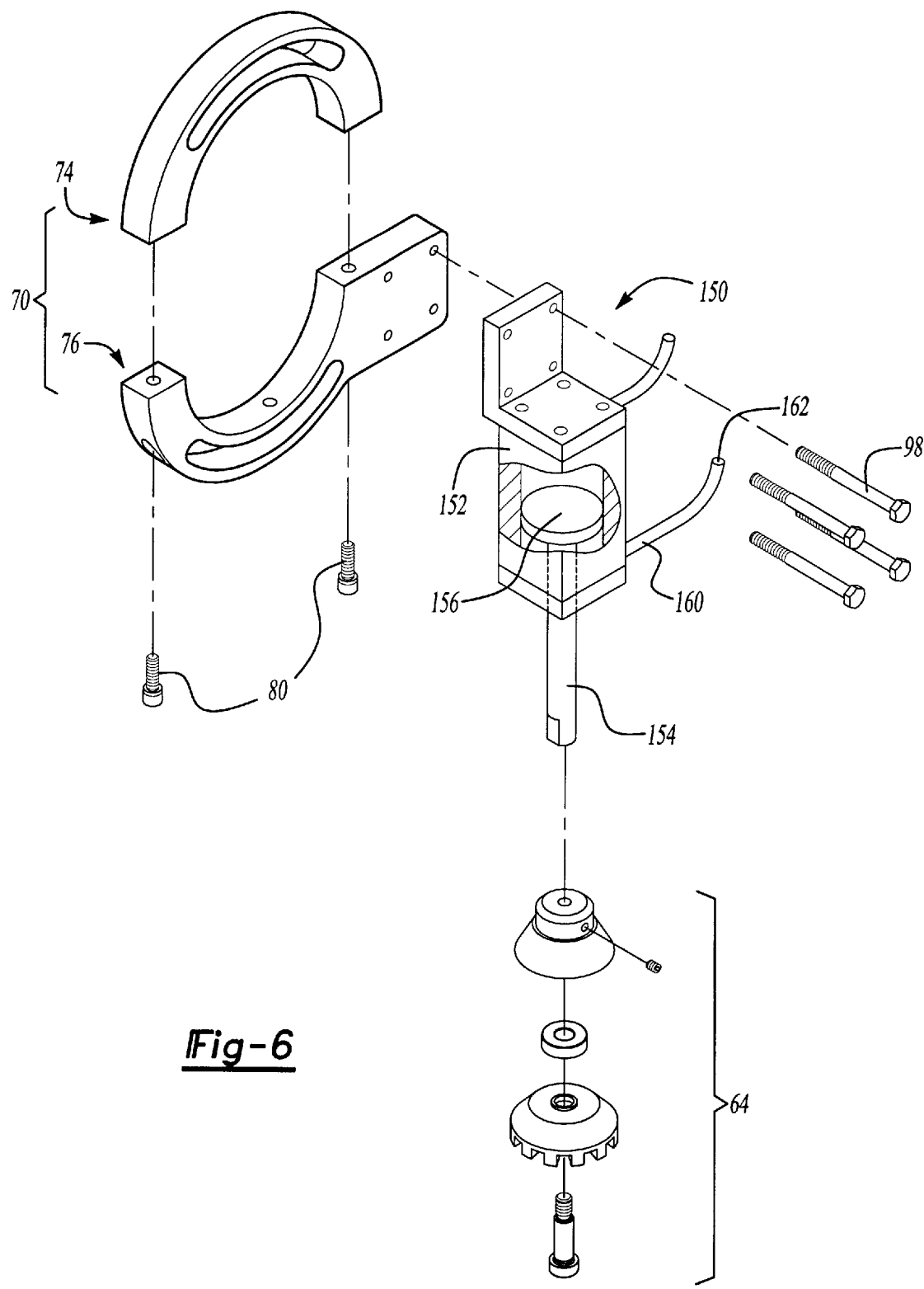
FIG. 6 is an exploded perspective view similar to FIG. 2 but illustrating a positioning device constructed in accordance with the teachings of an alternate embodiment of the present invention.

While the positioning device 10 has been described thus far as including an engagement mechanism 66 having a compression spring 130 to move the rod 62 and apply an axially directed force to the flange assembly 64, those skilled in the art will appreciate that the invention, in its broader aspects, may be constructed somewhat differently. For example, a fluid powered cylinder 150 may be substituted for engagement mechanism 66 and rod 62 as shown in FIG. 6. In this arrangement, fluid powered cylinder 150 conventionally includes a housing 152, a rod 154 and a piston 156. Housing 152 is coupled to second clamp structure 76 and essentially replaces mounting assembly 72. Piston 156 is disposed within housing 152 and is coupled to the proximal end of rod 154. The distal end of rod 154 is coupled to flange assembly 64.

Pressurized fluid from a pressure source (not shown) is supplied to first and second fluid ports 160 and 162 formed in housing 152 to permit piston 156 to be selectively moved along the longitudinal axis of housing 152. The pressurized fluid is preferably a compressible fluid, such as air, as high magnitude forces are neither necessary nor desirable to maintain first flange assembly 64 in stationary contact with windowsill 56.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A positioning device for positioning a movably mounted portion of a workpiece, the positioning device comprising:

an attachment structure having a rod aperture, the attachment structure adapted to be coupled to a robotic apparatus;

a rod disposed within the rod aperture and slidably positionable therein;

a flange assembly having a flange structure, the flange assembly coupled to a distal end of the rod, the flange structure being rotatable relative to the rod, the flange structure being adapted to engage the movably mounted portion of the workpiece; and an engagement mechanism coupled to the attachment structure and operable for moving the rod in an axial direction within the rod aperture, the engagement mechanism applying an axially directed force to the flange assembly for maintaining the flange structure in a stationary position relative to the movably mounted portion of the workpiece when the movably mounted portion of the workpiece is moved relative to a remaining portion of the workpiece.

2. The positioning device of claim 1, wherein the distal end of the flange structure includes a plurality of grooves.

3. The positioning device of claim 2, wherein each of the plurality of grooves is sized to receive a portion of the movably mounted portion of the workpiece.

4. The positioning device of claim 2, wherein each of the plurality of grooves lies along a line that intersects an axis about which the flange structure rotates.

5. The positioning device of claim 2, wherein each of the plurality of grooves is defined by a pair of wall members.

6. The positioning device of claim 1, wherein the flange assembly further includes a bearing coupled to the rod and supporting the flange structure for rotation.

7. The positioning device of claim 6, wherein the flange assembly further includes a second flange structure for receiving the axially directed force from the engagement mechanism.

8. The positioning device of claim 7, wherein the flange structure includes a hub portion and the second flange structure includes a recess portion wherein at least a portion of the hub portion is disposed in the recess portion.

9. The positioning device of claim 7, wherein the flange structure and the second flange structure are frusto-conically shaped.

10. The positioning device of claim 1, wherein the engagement mechanism includes a compression spring disposed between the attachment structure and the flange assembly.

11. The positioning device of claim 1, wherein the engagement mechanism includes a cylinder assembly having a piston and a housing, the cylinder assembly employing a compressible fluid that acts on the piston to generate the axially directed force.

12. The positioning device of claim 1, wherein the attachment structure includes a bracket assembly having a pair of clamp structures which are adapted to cooperatively exert a clamping force to fixedly but removably couple the positioning device to the robotic apparatus.

13. A positioning device for positioning a movably mounted portion of a workpiece, the positioning device comprising:

an attachment structure having a bracket assembly and a mounting assembly, the bracket assembly having a pair of clamp structures which are adapted to cooperatively exert a clamping force to fixedly but removably couple the positioning device to a robotic apparatus, the mounting assembly coupled to at least one of the clamp structures and having a rod aperture disposed therethrough;

a rod disposed within the rod aperture and slidably positionable therein;

a flange assembly having an upper flange structure, a bearing and a lower flange structure, the upper flange structure being fixedly coupled to the rod, the bearing rotatably coupling the lower flange structure to the rod, the lower flange structure being adapted to engage the movably mounted portion of the workpiece; and a compression spring disposed between the upper flange structure and the mounting assembly, the compression spring applying an axially directed force to the flange assembly for maintaining the lower flange structure in a stationary position relative to the movably mounted portion of the workpiece when the movably mounted portion of the workpiece is moved relative to a remaining portion of the workpiece.

14. A robotic apparatus for positioning a movably mounted portion of a workpiece, the robotic apparatus comprising:

an arm assembly movable in at least two orthogonal directions;

a positioning device coupled to the arm assembly, the positioning device including an attachment structure, a rod, a flange assembly and an engagement mechanism, the attachment structure coupled to the robotic apparatus and having a rod aperture, the rod disposed within the rod aperture and slidably positionable therein, the flange assembly having a flange structure, the flange assembly coupled to a distal end of the rod, the flange structure being rotatable relative to the rod, the flange structure being adapted to engage the movably mounted portion of the workpiece, the engagement mechanism coupled to the attachment structure and operable for moving the rod within the rod aperture, the engagement mechanism applying an axially directed force to the flange assembly for maintaining the flange structure in a stationary position relative to the movably mounted portion of the workpiece when the movably mounted portion of the workpiece is moved relative to a remaining portion of the workpiece.

15. The robotic apparatus of claim 14, wherein the arm assembly includes an end effector for performing a second operation.

16. The robotic apparatus of claim 15, wherein the end effector includes a spray gun apparatus for spraying a liquid material onto the workpiece.

17. The robotic apparatus of claim 14, wherein the engagement mechanism includes a compression spring disposed between the attachment structure and the flange assembly.

18. The robotic apparatus of claim 14, wherein the distal end of the flange structure includes a plurality of grooves, each of the plurality of grooves lying along a line that intersects an axis about which the flange structure rotates, each of the plurality of grooves being defined by a pair of wall members which are spaced apart to receive a portion of the movably mounted portion of the workpiece.

19. The robotic apparatus of claim 14, wherein the flange assembly further includes a bearing coupled to a portion of the flange assembly and supporting the flange structure for rotation.

20. The robotic apparatus of claim 19, wherein the flange assembly further includes a second flange structure for receiving the axially directed force from the engagement mechanism.

\* \* \* \* \*